(12) United States Patent
Hope

(10) Patent No.: US 7,995,794 B2
(45) Date of Patent: Aug. 9, 2011

(54) REMOTE CONTROL OF AN IMAGE CAPTURING UNIT IN A PORTABLE ELECTRONIC DEVICE

(75) Inventor: Julian Charles Hope, Bolton (GB)

(73) Assignee: Sony Ericsson Mobile Communications AB, Lund (SE)

( * ) Notice: Subject to any disclaimer, the term of this patent is extended or adjusted under 35 U.S.C. 154(b) by 943 days.

(21) Appl. No.: 11/690,511

(22) Filed: Mar. 23, 2007

(65) Prior Publication Data
US 2008/0212831 A1 Sep. 4, 2008

Related U.S. Application Data

(60) Provisional application No. 60/892,598, filed on Mar. 2, 2007.

(51) Int. Cl.
*G06K 9/00* (2006.01)
(52) U.S. Cl. ........................................ 382/103
(58) Field of Classification Search .............. 382/103, 382/117, 118, 190; 396/56, 57; 352/179; 348/14.05, 114, 211.2, 211.8
See application file for complete search history.

(56) References Cited

U.S. PATENT DOCUMENTS

| | | | | |
|---|---|---|---|---|
| 4,513,317 A * | 4/1985 | Ruoff, Jr. | ........ | 375/240.25 |
| 4,950,069 A * | 8/1990 | Hutchinson | ........ | 351/210 |
| 5,359,384 A | 10/1994 | Ide | | |
| 5,570,151 A | 10/1996 | Terunuma et al. | | |
| 5,859,921 A | 1/1999 | Suzuki | | |
| 6,307,589 B1 * | 10/2001 | Maquire, Jr. | ........ | 348/333.03 |
| 6,373,961 B1 * | 4/2002 | Richardson et al. | ........ | 382/103 |
| 6,400,903 B1 | 6/2002 | Conoval | ........ | 396/56 |
| 6,549,231 B1 * | 4/2003 | Matsui | ........ | 348/61 |
| 6,885,818 B2 * | 4/2005 | Goldstein | ........ | 396/59 |
| 2003/0016332 A1 * | 1/2003 | Trajkovic et al. | ........ | 351/209 |
| 2003/0021601 A1 | 1/2003 | Goldstein | | |
| 2003/0095140 A1 * | 5/2003 | Keaton et al. | ........ | 345/700 |
| 2006/0192868 A1 * | 8/2006 | Wakamori | ........ | 348/294 |
| 2007/0273611 A1 * | 11/2007 | Torch | ........ | 345/8 |

FOREIGN PATENT DOCUMENTS
JP 7-295085 11/1995

OTHER PUBLICATIONS

International Search Report and Written Opinion for PCT/EP2007/059046 dated Jan. 25, 2008, 25 pages.

* cited by examiner

*Primary Examiner* — Jason M Repko
*Assistant Examiner* — Shervin Nakhjavan
(74) *Attorney, Agent, or Firm* — Harrity & Harrity, LLP

(57) ABSTRACT

A method and computer program product are described herein for remotely controlling a first image capturing unit in a portable electronic device as well as to such a portable electronic device. The portable electronic device may include a first and a second image capturing unit. The device detects and tracks an object via the second capturing unit and detects changes in an area of the object. These changes are then used for controlling the first image capturing unit remotely. When the control involves capturing of images an improved image quality can be obtained. Also the time it takes to capture an image is reduced.

22 Claims, 3 Drawing Sheets

REMOTE CONTROL OF AN IMAGE CAPTURING UNIT IN A PORTABLE ELECTRONIC DEVICE

RELATED APPLICATION

This application claims priority under 35 U.S.C. §119 based on U.S. Provisional Patent Application No. 60/892,598, filed Mar. 2, 2007, the disclosure of which is incorporated by reference herein in its entirety.

TECHNICAL FIELD OF THE INVENTION

The present invention relates to the field of image capturing units in portable electronic devices. The present invention is more particularly directed towards a method and computer program product for remotely controlling a first image capturing unit of a portable electronic device as well as to such a portable electronic device.

DESCRIPTION OF RELATED ART

Cameras and other image capturing units have become smaller and smaller and are nowadays often present in portable electronic devices like cellular phones.

It would however be of interest to remotely control such an image capturing unit in such a device. One reason for this is that when, for instance, the image may get blurred because the device is slightly shaken as the user presses a button to activate the image taking.

Remote control devices for cameras exist. In for instance, U.S. Pat. No. 6,400,903, there is described the remote control of a camera from a computer. Here the computer sends commands to the camera and receives images from the camera. It is also possible to control different functions relating to the camera such as zoom, position on a tripod etc. However, these devices are complicated, involve an increase cost and often need to be connected to the camera, which involves a certain effort by the user. They may also be lost.

It is furthermore often desirable to hold the camera in the hand in order to allow a high flexibility in selecting scenes that are to be captured by a user. To obtain a good image quality both hands may need to be used. This is hard to combine with an additional remote control device.

It would therefore be of interest to provide remote control of a camera in a portable electronic device that can be performed without any additional devices, but only using the capabilities of the portable electronic device.

There is thus a need for an improved remote control of an image capturing unit in a portable electronic device.

SUMMARY OF THE INVENTION

The present invention is therefore directed towards solving the problem of providing an improved remote control of a first image capturing unit in a portable electronic device.

According to a first aspect, a method for remotely controlling a first image capturing unit of a portable electronic device may include optically detecting and tracking an object via a second image capturing unit, detecting at least one change in at least one area of said object via said second image capturing unit, and controlling the first image capturing unit based on said change in said area.

A second aspect may include the features of the first aspect and may further include receiving an instruction to activate remote control via inputs made by a user of said portable electronic device.

A third aspect may include the features of the second aspect and may further include focusing the first image capturing unit on an element in a scene viewed by the first image capturing unit as a response to said instruction.

A fourth aspect may include the features of the second aspect and may further include indicating to the user when said object is being detected and tracked.

A fifth aspect may include the features of the first aspect, wherein the object is a face of a user of the portable electronic device and wherein controlling the first image capturing unit may include capturing an image based on at least one change in the object.

A sixth aspect may include the features of the fifth aspect, wherein controlling the first image capturing unit may include zooming a scene viewed by said first image capturing unit based on a second change in the at least one area of the object.

A seventh aspect may include the features of the first aspect and may further include presenting a scene viewed by said first image capturing unit to a user.

According to an eighth aspect, the object may be a part of the body of a user of the portable electronic device.

According to a ninth aspect, the part of the body may be the user of the user.

According to a tenth aspect, the area may include at least one eye.

An eleventh aspect of the present invention includes the features of the tenth aspect, wherein a change of the object is the blinking of an eye.

A twelfth aspect is directed to a portable electronic device comprising a first image capturing unit, a second image capturing unit, and an image capturing control unit. The image capturing control unit may be configured to optically detect and track an object via said second image capturing unit, detect at least one change in at least one area of said object via said second image capturing unit, and control said first image capturing unit based on said change in said area.

A thirteenth aspect may include the features of the twelfth aspect and may further comprise at least one user input unit, where said image capturing control unit is further configured to receive an instruction to activate remote control through inputs made by a user via said user input unit.

A fourteenth aspect may include the features of the thirteenth aspect, wherein said image capturing control unit may be further configured to focus the first image capturing unit on an element in a scene viewed by the first image capturing unit as a response to said instruction.

A fifteenth aspect may include the features of the twelfth aspect, further comprising at least one user output unit, where said image capturing control unit is further configured to indicate to the user when said object is being detected and tracked via said user output unit.

A sixteenth aspect may include the features of the twelfth aspect, wherein said image capturing control unit is configured to control said first image capturing unit to capture an image based on at least one change in the object.

A seventeenth aspect may include the features of the sixteenth aspect, wherein there is more than one change of the object and said image capturing control unit when being configured to control said first image capturing unit is configured to control the first image capturing unit to zoom the scene viewed by said first image capturing unit based on another change in the object.

An eighteenth aspect may include the features of the twelfth aspect, further comprising at least one user output unit, where said image capturing control unit is further configured to present a scene viewed by the first image capturing unit to the user via said user output unit.

A nineteenth aspect may include the features of the twelfth aspect, wherein the object is a part of the body of a user of the portable electronic device.

A twentieth aspect may includes the features of the nineteenth aspect, wherein the part of the body is the head.

A twenty-first aspect may include the features of the twentieth aspect, wherein said area includes at least one eye.

A twenty-second aspect may include the features of the twenty-first aspect, wherein the change of the object is the blinking of at least one eye.

A twenty-third aspect may include the features of the twelfth aspect, wherein it is a portable communication device.

A twenty-fourth aspect may include the features of the twenty-third aspect, wherein it is a cellular phone.

A twenty-fifth aspect may be directed towards a portable electronic device for remotely controlling a first image capturing unit of the portable electronic device comprising: means for optically detecting and tracking an object via a second image capturing unit, means for detecting at least one change in at least one area of said object via said second image capturing unit, and means for controlling the first image capturing unit based on said change in said area.

According to a twenty-sixth aspect, a computer program product for remotely controlling a first image capturing unit of a portable electronic device includes a first image capturing unit and comprises computer program code to make the portable electronic device operate to, when said code is loaded into the portable electronic device: optically detect and track an object via a second image capturing unit, detect at least one change in at least one area of said object via said second image capturing unit, and control the first image capturing unit based on said change in said area.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The present invention will now be described in more detail in relation to the enclosed drawings, in which.

DETAILED DESCRIPTION OF EMBODIMENTS

The present invention relates to a portable electronic device that is provided with a first and a second image capturing unit.

As described herein, a portable electronic device, may optically detect and track an object (such as a user's face) via an image capturing unit in the portable electronic device and detect changes in the object. These changes may then be used to control another image capturing unit in the portable electronic device.

Many advantages can be obtained through the techniques described herein. For example, it is possible to remotely control the first image capturing unit through only changing an object, for instance through blinking of eyes. There is no need for any additional remote control device. Due to the increasingly lighter weights of portable electronic devices, pressing a capture button to capture an image can move the device slightly and cause blurring of the image. Through allowing the image to be captured without pressing a button, a much improved image quality can be obtained. The remote control furthermore allows a user to hold the portable electronic device with both hands and thus increases freedom in selecting scenes together with a reasonable mechanical stability may be provided. According to the present invention also the time it takes to capture an image is reduced. This allows a user to react to an event much faster than he/she can do by pressing a button. Consequently, the user would have a better chance of capturing the exact moment he/she wants. Since the units necessary for controlling an image capturing unit already exist in many portable electronic devices, the only additional functionality needed may be provided as software. This means that the present invention may be produced at low additional costs.

Figure 1:
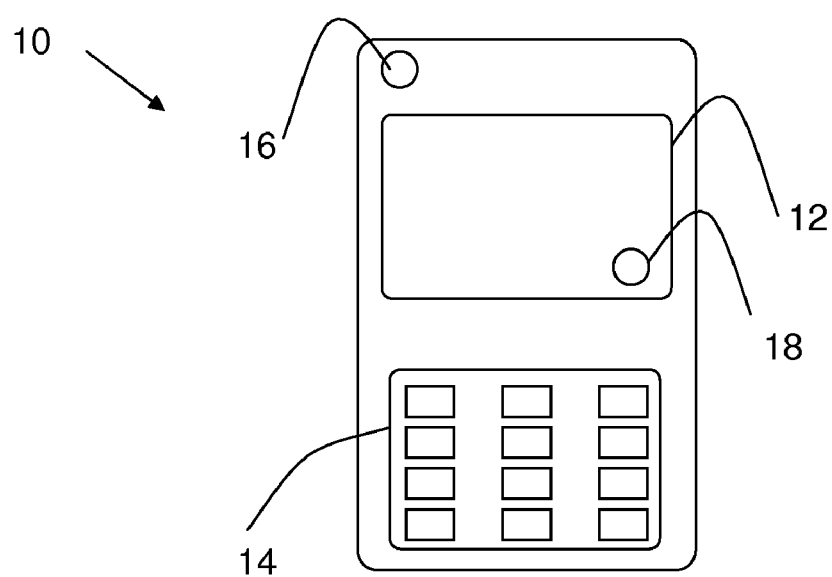
FIG. 1 schematically shows a front view cellular phone according to the present invention.
Figure 2:
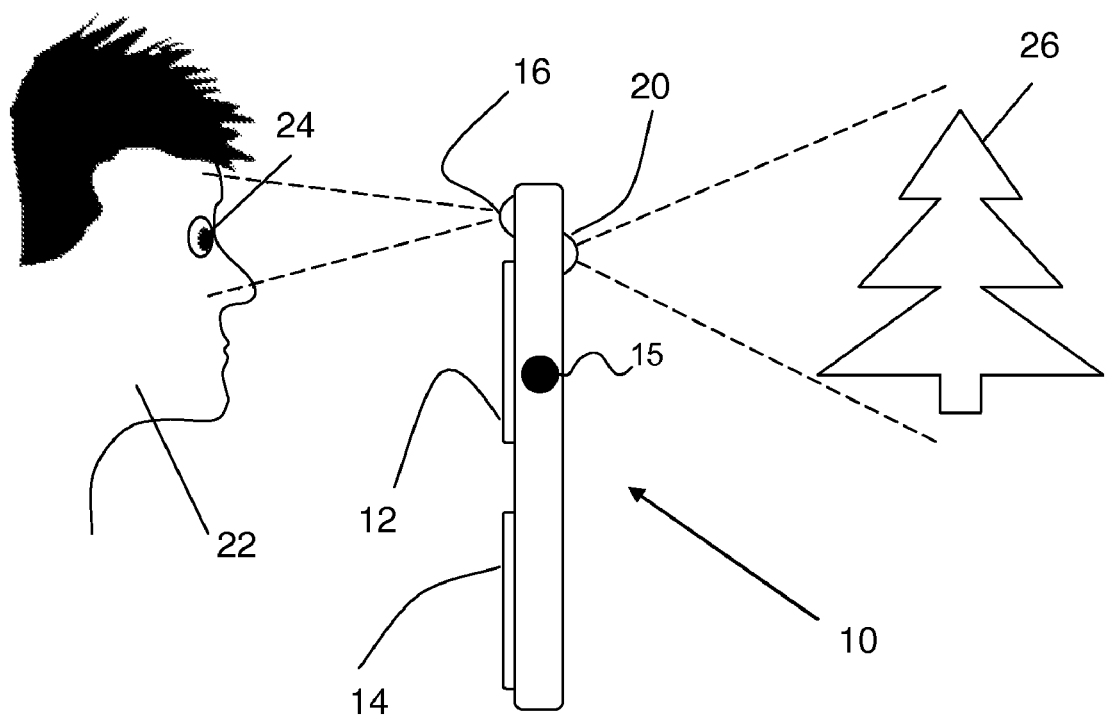
FIG. 2 shows a side view of the cellular phone shown in FIG. 1 in use by a user when capturing a scene.

In FIG. 1 there is shown a front view of a portable electronic device 10 in the form of a cellular phone and in FIG. 2 there is shown a side view of the phone 10 when being used by a user. In FIG. 2 only the face 22 of the user, particularly including eye 24 of the user, will be shown. Phone 10 may include a user output unit in the form of a display 12 on a front side, in which there is shown an indicator 18. The purpose of this indicator will be described in more detail later. Here it is sufficient to say that the indicator may typically be provided as a light of a certain colour. For this reason the user output unit used for the indicator may as an alternative be provided separately from the display 12, for instance in the form of a LED (Light Emitting Diode). It is also possible to provide a sound indication through the use of a speaker.

Phone 10 may also include a set of user input units in the form of a number of keys on a keypad 14 on the front side. There is also a further user input unit in the form of a special button 15 provided on a side of the phone 10. This button 15 may have a first extended position, a second half-way depressed position and a third fully depressed position in which the actuating surface of the button 15 is aligned with the side of the phone 10 on which the button is provided. It should be realised that other user input units may be used in the present invention, such as a a touch screen or even a microphone. On the front side of the phone 10 there is also provided a video image capturing unit 16 in the form of a video camera. This is normally used by the user in video phone sessions with other people. It can of course also be used for filming video. On the back side of the phone 10 there is furthermore provided a still image capturing unit 20 in the form of a digital camera. This camera can be used to capture still images of different scenes. One such scene 26 is shown in FIG. 2 and includes a tree. The still image capturing unit is here an example of a first image capturing unit, while the video image capturing unit is an example of a second image capturing unit that is involved in controlling the first image capturing unit.

A cellular phone is just one example of a portable electronic device with an ability to communicate. The invention is in no way limited to cellular phones, but can be applied on other types of devices like portable communication devices, for instance a smartphone and a communicator or other portable electronic devices like a lap top computer, a palm top computer or an electronic organizer.

Figure 3:
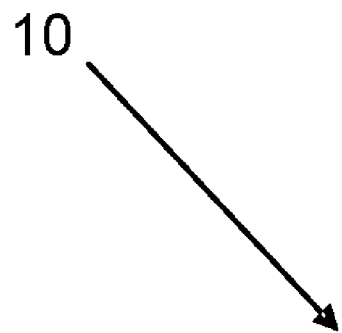
FIG. 3 shows a block schematic of different units provided in the phone for implementing the present invention.
Figure 3:
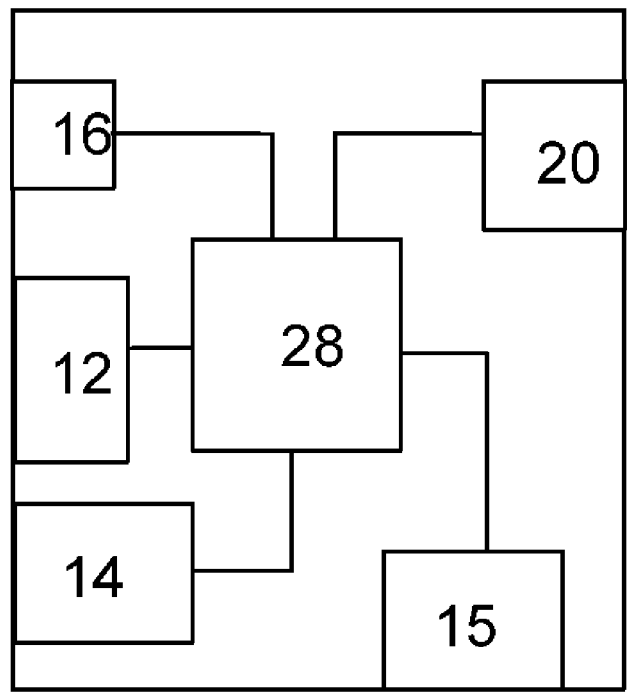

FIG. 3 shows a block schematic of the different units in the phone 10 that are used in relation to the present invention. The phone 10 includes the user input units 14 and 15, i.e. keypad 14 and button 15, the user output unit, i.e. display 12, video image capturing unit 16 and still image capturing unit 20. The image capturing units 16 and 20 may both typically include lenses connected to digital image receiving units, which convert projected images into digital images. Such a digital image receiving unit may include a CCD (Charge-Coupled Device) unit. The video image capturing unit may also include a video coding unit that codes such images into video data, for instance according to the MPEG (Moving Picture Expert Group) format. All the above described units are connected to an image capturing control unit 28, which controls the functionality of the phone 10 according to the present invention. The two image capturing units 16 and 20 are also connected to the display 12. It should here be realised that the phone normally includes several more units and functions. However, these have here been omitted in order to better focus on the present invention.

Figure 4:
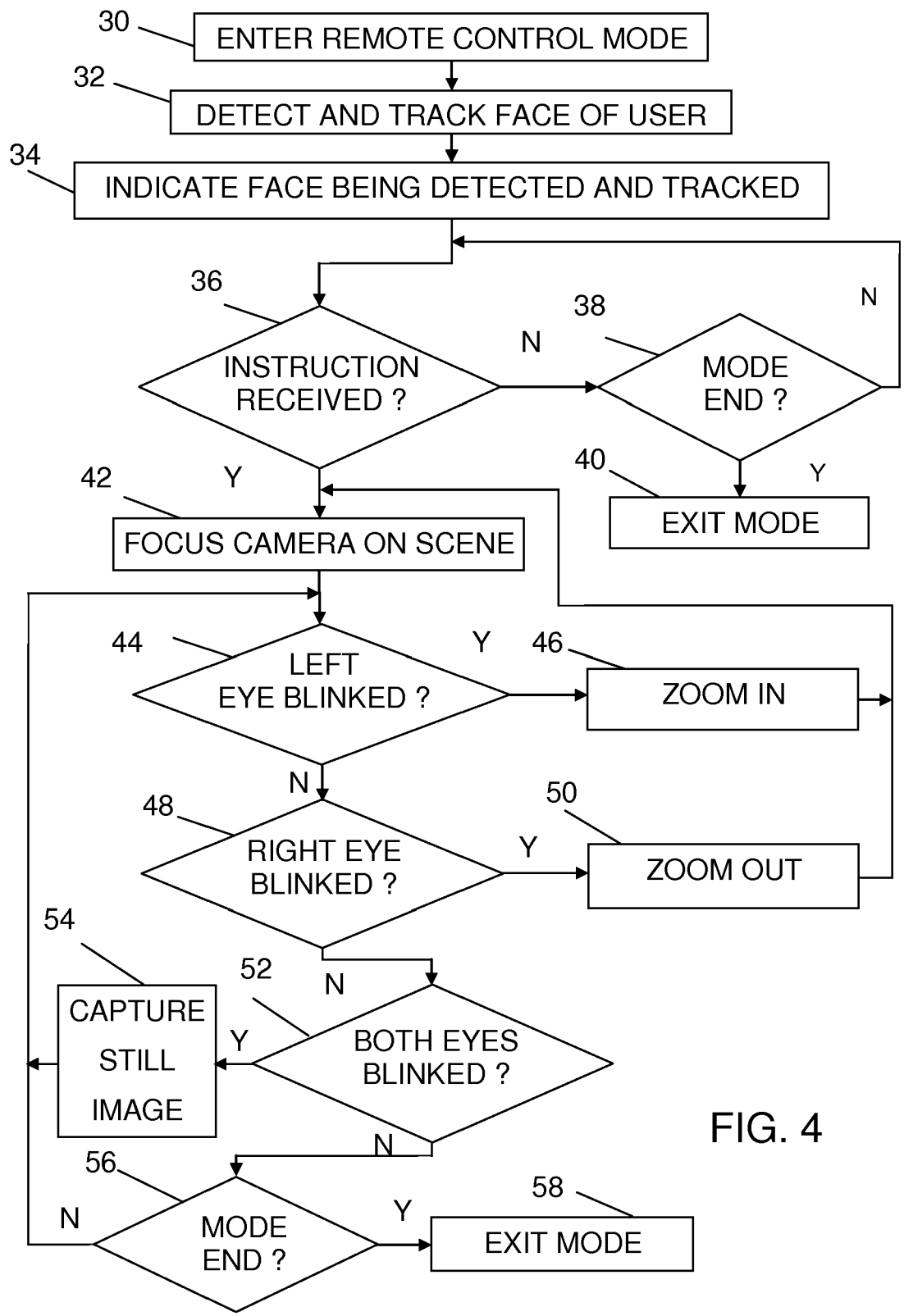
FIG. 4 shows a flow chart of a number of method steps taken in a method according to the present invention carried out in the phone, and FIG. 5 schematically shows a computer program product in the form of a CD Rom disc comprising computer program code for carrying out the invention.

The functioning of the invention will now be described with reference being made to the above described FIG. 1-3 as well as to FIG. 4, which shows a flow chart of a number of exemplary operations carried out in phone 10.

Concepts described herein are directed towards detecting and tracking an object via the video capturing unit 16 and detecting changes in an area of the object. These changes may then used for controlling the still image capturing unit 20. In the following description this object is head 22 of the user in an area 24 where the eyes are located. It should however be realised that the invention is in no way limited to being applied on the eyes or even the head of a user, but may be applied to any object or area of the user.

A remote control mode for the still image capturing unit 20 may be provided. This mode may be entered through the user making a suitable selection in a menu system of the phone or through pressing a dedicated button associated with this remote control mode. However it is also possible that this mode is the only mode of operation for the still image capturing unit 20. Therefore the mode may also be entered as soon as a camera functionality is selected, for instance through removing a lens protection device from the still image capturing unit 20. The method may thus start by the remote control mode being entered, step 30. This mode may be initiated by the user using, for example, keypad 14. The image capturing control unit 28 may then activates the video image capturing unit 16 in order to provide image data of a field of view covered by the video image capturing unit 16. The user here may look at the video image capturing unit so that his face 22 and details of the face such as nose, lips and eyes 24 can be registered. The image capturing control unit 28 may include face recognition functionality, which optically detects and tracks the face, step 32, from image data registered by the video image capturing unit 16. This may be performed by, for example, segmenting the registered image, for instance according to various fields of colour and junctions between such fields of different colour, detecting that one or more such segments make up a face and then tracking the face, i.e. following the movement of the face. When the face has been identified and tracked, step 32, this may be indicated to the user, step 34. This is done through the image capturing control unit 28 controlling the display 12 to activate the indicator 18, for instance through using a certain colour. In this way the user is informed that he/she may now perform remote control of the still image capturing unit 20. Thereafter the image capturing control unit 28 orders the still image capturing unit 20 to present the scene 26 on the display 12 in a view-finder mode of operation and awaits instructions from the user to activate remote control.

In case there is no such instruction, step 36, the image capturing control unit 28 then investigates if the remote control mode is to be ended, step 38, which may be the case if the user has not performed any actions within a certain time limit or if the user has decided to exit the remote camera mode through the activation of a button or key on the phone. If the mode is to be ended, then the image capturing control unit 28 exits the mode, step 40, and otherwise returns and waits for an instruction.

An instruction may be received through the user moving the button 15 on the phone 10 from the first position to the second half-way depressed position. Here a movement of the button 15 to the third position might lead to a capturing of an image by the still image capturing unit 20 in normal fashion. When an instruction is received, step 36, the image capturing control unit 28 controls the still image capturing unit 20 to focus on the scene 26, step 42. This may be performed through the still image capturing unit 20 auto-focusing on an element in scene 26, such as the tree. Thereafter, the face recognition function of the image capturing control unit 28 observes changes in at least one area of the tracked and detected face 22 of the user and controls the still image capturing unit 20 based on these changes. In the embodiment described here this area 24 is the area of the eyes of the user.

The face recognition function may detect predetermined movements of the user in area 24, such as blinking by the user. If the user now blinks with only his left eye, step 44, the image capturing control unit 28 orders the still image capturing unit 20 to zoom in on scene 26, step 46, again perform auto-focusing, step 42, and then continue to observe changes in the eye area 24 of the face 22. In the situation in which the left eye is not blinked alone, step 44, the image capturing control unit 28 determines if only the right eye is blinked, step 48. If this is the case, the image capturing control unit 28 controls the still image capturing unit 20 to zoom out in the scene 26, step 50, again perform auto-focusing, step 42, and then continue to observe changes in the eye area 24 of the face 22. In case the right eye was not blinked alone, step 48, the image capturing control unit 28 investigates if both eyes were blinked simultaneously, step 52. If they were, the image capturing control unit 28 orders the still image capturing unit 20 to capture a still image, step 54, and thereafter continue to observe changes in the eye area 24 of the face 22. In case no eyes were blinked, step 52, the image capturing control unit 28 determines if the remote control mode is to be ended, step 56, which may be the case if the user has not performed any blinking within a certain time or if the user has decided to exit the remote camera mode through the actuation of the button 15. This may be achieved through completely releasing the button 15 so that it moves back to the first position, which would thus turn off remote control and thus allows the user to blink as normal. If the mode is to be ended, then the image capturing control unit 28 exits the mode, step 58.

In the manner described above it is possible to remotely control the still image capturing unit through only blinking of the eyes. Due to the increasingly lighter weights of mobile camera phones, pressing a capture button to take a picture can move the phone slightly and cause blurring of the image. Through allowing the picture to be taken without pressing a button, a much improved quality of picture can be obtained. The remote control does furthermore allow a user to hold the portable electronic device with both hands without using a special remote control device and thus a great freedom in selecting scenes together with a reasonable mechanical stability may be provided. Also, according to the present invention, the time it takes to take a picture is reduced. This allows the user to react to an event by much faster than he/she can do by pressing a button. Consequently, the user would have a better chance of capturing the exact moment he/she wants.

Since the different capturing units, display, keys and buttons already exist in many portable electronic devices, the only additional functionality needed may be provided as software. This means that the present invention may be produced at low additional costs.

There are a number of variations that can be made to the present invention apart from the ones already mentioned. It is possible that only one eye is used for controlling the still image capturing unit, where a blinking of the eye would then only capture a still image. A blinking of only the left eye may of course be used for zooming out and the right eye for zooming in. It is also possible to have blinking control of other functions of the still image capturing device. It is also possible that other areas of the face are used for controlling the still image capturing unit either instead of or in addition to the eyes, for instance the mouth. It is furthermore possible that it is another object than the head of the user that is used, for instance an arm or a hand of the user. The present invention is therefore directed towards detecting and tracking an object via the video capturing unit and detecting changes in an area of that object, which changes are then used for controlling the still image capturing unit. The invention is furthermore not limited to the above described positions of the button used or even to the use of a dedicated button for giving the instruction to activate remote control and leaving the remote control mode. Other ways may be provided for this purpose, for instance using the keypad or even using voice-recognition. Thus any tactile or audio input unit may be used for providing the instruction and leaving the remote control mode.

Figure 5:
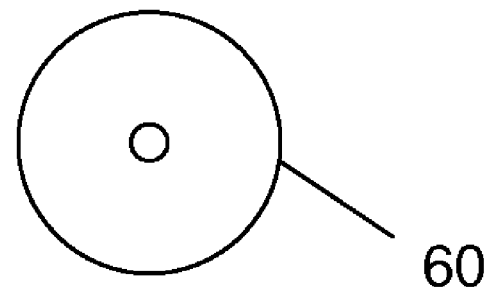

The capturing control unit in the phone is normally provided in the form of one or more processors together with a program memory store containing program code for performing the functions of this capturing control unit. This program code can also be provided on a computer program product, like a CD ROM disc, a memory stick or another suitable data carrier, which performs the invention when being loaded into the device. One such medium is schematically shown in FIG. 5, which shows a CD ROM disc 60, on which the program code for the phone may be provided. The program code may furthermore be provided on an external server and downloaded from there into the phone.

It should furthermore be known that the video image capturing unit may have still image capturing ability and the still image capturing unit may have video image capturing ability. The remote control described above is therefore not limited to still images but may also be applied when capturing video. It is furthermore not necessary to present the scene to the user.

Therefore the present invention is only to be limited by the following claims.

The invention claimed is:

1. A method for remotely controlling a first image capturing unit of a portable electronic device, the method comprising:
    capturing, by a second image capturing unit, image data of a field of view of the second image capturing unit
    segmenting, into a plurality of segments, the captured image data, where the captured image data is segmented based on fields of color, of the captured image data
    determining that one or more of the plurality of segments, are associated with an object located within the field of view of the second image capturing unit
    optically detecting and tracking, based on the one or more of the plurality of segments, the object via the second image capturing unit;
    detecting, based on optically detecting and tracking the object, a first change in at least one area of the object where the first image capturing unit and the second image capturing unit are positioned within the portable electronic device, and the first change is caused by a movement initiated by a user while utilizing both hands to hold the portable electronic device in a position that allows the first image capturing device to view a scene to be captured;
    controlling the first image capturing unit based on the first change in the at least one area, where the controlling comprises capturing an image based on the detected first change;
    detecting, based on optically detecting and tracking the object, a second change in the at least one area, where the second change is different from the first change; and
    zooming the scene viewed by the first image capturing unit based on the detected second change.

2. The method according to claim 1, further comprising:
   receiving an instruction to activate remote control of the portable electronic device via inputs made by the user of the portable electronic device.

3. The method according to claim 2, further comprising:
   focusing the first image capturing unit on an element in the scene viewed by the first image capturing unit in response to the instruction.

4. The method according to claim 2, further comprising:
   indicating to the user when the object is being detected and tracked.

5. The method according to claim 1, where the object is a face of the user of the portable electronic device.

6. The method according to claim 1, further comprising:
   presenting the scene viewed by the first image capturing unit to the user of the portable electronic device via a display of the portable electronic device.

7. The method according to claim 1, where the object is a part of a body of the user of the portable electronic device.

8. The method according to claim 7, where the part of the body is a head.

9. The method according to claim 8, where the at least one area includes at least one eye.

10. The method according to claim 9, where the first change of the object includes a blinking of the at least one eye.

11. A portable electronic device comprising:
   a first image capturing unit,
   a second image capturing unit, and
   an image capturing control unit to:
       control the second image capturing unit to capture an image of an object, positioned within a field of view of the second image capturing unit,
       segment, into a plurality of segments, the captured image, where the captured image is segmented according to fields of color and junctions between the fields of color,
       determine that one or more of the plurality of segments, are associated with the object,
       optically detect and track, based on the one or more of the plurality of segments, the object via the second image capturing unit,
       detect, based on optically detecting and tracking the object, a first change in at least one area of the object via the second image capturing unit, control the first image capturing unit based on the first change in the at least one area, where the controlling comprises capturing an image based on the detected first change, detect, based on optically detecting and tracking the object, a second change in the at least one area, where the second change is different from the first change, and zoom a scene viewed by the first image capturing unit based on the detected second change, where the first image capturing unit, the second image capturing unit, and the image capturing control unit are integrated within the portable electronic device and allow a user to utilize both hands to stabilize the portable electronic device while initiating a movement to cause the first change or the second change.

12. The portable electronic device according to claim 11, further comprising:
at least one user input unit, and where the image capturing control unit is further to:
receive an instruction to activate remote control of the image capturing unit through inputs made by the user via the at least one user input unit.

13. The portable electronic device according to claim 12, where the image capturing control unit is further to:
focus the first image capturing unit on an element in the scene viewed by the first image capturing unit in response to receiving the instruction.

14. The portable electronic device according to claim 11, further comprising:
at least one user output unit, and where the image capturing control unit is further to:
indicate, via the at least one user output unit and to the user, that the object is being detected and tracked.

15. The portable electronic device according to claim 11, further comprising:
at least one user output unit, and where the image capturing control unit is further to:
present, via the at least one user output unit, the scene viewed by the first image capturing unit to the user.

16. The portable electronic device according to claim 11, where the object is a part of a body of the user of the portable electronic device.

17. The portable electronic device according to claim 16, where the part of the body is a head.

18. The portable electronic device according to claim 17, where the at least one area includes at least one eye.

19. The portable electronic device according to claim 18, where the first change of the object is a blinking of the at least one eye.

20. The portable electronic device according to claim 11, where the portable electronic device includes a portable communication device.

21. The portable electronic device according to claim 20, where the portable electronic device includes a mobile phone.

22. A memory device storing instructions executable by a processor of a portable electronic device that includes a first image capturing unit, the memory device comprising:
one or more instruction to capture data corresponding to a field of view of a second image capturing unit;
one or more instructions to segment, into a plurality of segments and based on fields of color, the captured data;
one or more instructions to determine that one or more of the plurality of segments are associated with an object positioned within the field of view of the second image capturing unit;
one or more instructions to optically detect and track, based on the one or more of the plurality of segments, the object via the second image capturing unit;
one or more instructions to detect, based on optically detecting and tracking the object, a first change in at least one area of the object;
one or more instructions to control the first image capturing unit based on the first change in the at least one area, where the one or more instructions to control comprise one or more instructions to capture an image based on the detected first change;
one or more instructions to detecting, based on optically detecting and tracking the object, a second change in the at least one area, where the second change is different from the first change; and
one or more instructions to zoom a scene viewed by the first image capturing unit based on the detected second change,
where the memory device, the first image capturing unit, and the second image capturing unit are positioned within the portable electronic device to allow a user to hold the portable electronic device with both hands while initiating a movement to cause the first change or the second change.

* * * * *